Oct. 15, 1963 L. THORNSBERRY 3,106,972
ROTARY DRILL BIT FOR STONE OR THE LIKE
Filed June 25, 1962

INVENTOR
LANDELL THORNSBERRY
BY
ATTORNEY

United States Patent Office 3,106,972
Patented Oct. 15, 1963

3,106,972
ROTARY DRILL BIT FOR STONE OR THE LIKE
Landell Thornsberry, Wheelwright, Ky., assignor of one-half to Coal Bit Company, Prestonburg, Ky., a corporation of Kentucky
Filed June 25, 1962, Ser. No. 204,993
4 Claims. (Cl. 175—398)

This invention relates to mining tools and more particularly to a rotary drill bit, which may be utilized in a conventional rotary drill for drilling holes in stone or the like, and the bit of this invention is particularly adapted for drilling holes in the roof of a mine tunnel which are to be utilized for receiving supporting bolts.

Heretofore, numerous types of drill bits for use in rotary drills in drilling stone or the like have been proposed and utilized, but these drill bits provide symmetrical cutting edges which results in grinding or scraping the rock or the like in the form of mortar or very fine grains which results in providing a relatively slow cutting action, and which also results in rapid dulling of the drill bit cutting edges, thereby requiring frequent re-sharpening with a consequent loss of time and drilling efficiency.

It is accordingly an object of this invention to provide a rotary drill bit for stone or the like, so formed as to remove the stone in the form of relatively large particles or chips, thereby materially increasing the speed of drilling and also increasing the time required between sharpening operations.

A further object of the invention is the provision of a rotary drill bit for stone or the like in which the cutting edges are non-symmetrical, thereby providing an unequal load on such cutting edges which results in a wobbling motion of the bit during cutting, thereby removing the stone in the form of relatively large chips or particles.

A still further object of the invention is the provision of a rotary drill bit for stone or the like providing two cutting edges, one of which is materially shorter than the other, thereby resulting in an unequal load on the cutting edges to provide a wobbling action or motion which causes the removal of stone in the form of relatively large chips or particles.

Another object of the invention is the provision of a rotary drill bit for stone or the like, having diametrically opposed cutting edges, and in which a notch is provided in one cutting edge, resulting in an unequal load to cause a wobbling motion during operation of the drill.

Further objects and advantages of the invention will be apparent from the following description taken in conjunction with the accompanying drawing, wherein.

Figure 2:
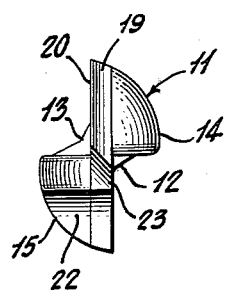
FIG. 2 is an end elevational view showing the disposition of the cutting edges of the drill bit of FIG. 1.
Figure 3:
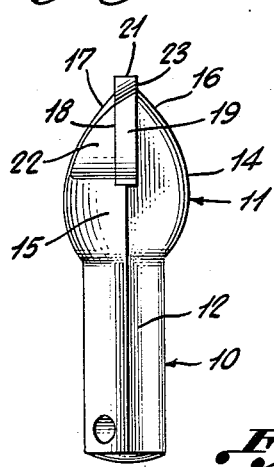
FIG. 3 is a side elevational view taken substantially in the plane of the cutting edges.
Figure 5:
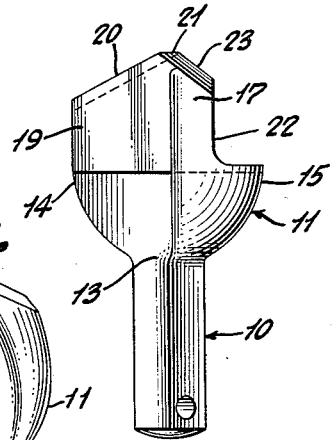
FIG. 5 is a side elevational view showing the relationship between the shank and the head portion of the drill bit.
Figure 4:
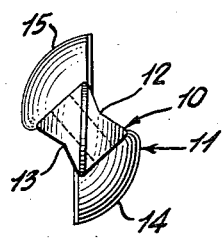
FIG. 4 is a bottom plan view taken substantially at right angles to the plane of the cutting edges.

With continued reference to the drawing, there is shown a rotary drill bit constructed in accordance with this invention, and which may well comprise a shank 10 of polygonal cross-section for coupling the bit to a drill, and the shank 10 merges into an enlarged head 11 having a maximum transverse dimension, as shown in FIG. 5, substantially equal to the diameter of a hole to be drilled by the bit, and a minimum transverse dimension, as shown in FIG. 3, substantially less than the diameter of the hole to be drilled. As best shown in FIGS. 2 and 4, the shank 10 and head 11 are provided with a pair of opposed, longitudinally extending straight flutes 12 and 13 which serve to divide the head 11 into opposite, transverse lobes 14 and 15. It is to be noted that the ends of the lobes 14 and 15 remote from the shank 10 are beveled outwardly from the axis of the head, as shown at 16 and 17.

The head 11 is provided with a transverse slot 18 extending through the lobes 14 and 15 from the point of maximum transverse dimension to the end remote from the shank 10, and disposed in the slot 18 and securely fastened therein in any suitable manner is a hard metal cutting member 19 which may be formed of tungsten carbide, or any other suitable material.

Figure 1:
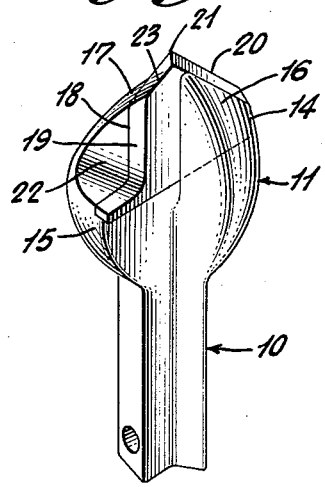
FIG. 1 is a view in perspective showing a rotary drill bit constructed in accordance with this invention.

The portion of the cutting member 19 disposed within the lobe 14 is formed along its outer edge to provide a cutting edge 20 extending from a point 21 at the axis of the tool to the outer side edge of the lobe 14, and a portion of the cutting member 19 disposed in the lobe 15, as well as a portion of such lobe removed to provide an axially extending notch 22, which extends from the outer side edge of the lobe 15 inwardly to a point spaced from the axis 21 of the head 11. The portion of the cutting member 19 between the notch 22 and the axis 21 is formed to provide a relatively short cutting edge 23, as clearly shown in FIGS. 1 and 5.

The provision of non-symmetrical cutting edges in the form of a relatively long cutting edge 20 and a relatively short cutting edge 23 result in an unequal load on the cutting edges and drill bit during operation thereof, with the result that the drill bit tends to have a wobbling motion in the hole being drilled, as a consequence of which the cutting edges 20 and 23 remove the stone or the like in the form of relatively coarse particles or chips, thereby providing a relatively rapid drilling operation, as compared to drill bits which remove the stone or the like in the form of dust or powder. Furthermore, the removal of the stone or the like in the form of relatively large chips or particles materially reduces the grinding action of the stone on the cutting edges, thereby increasing the life of the same, and requiring fewer re-sharpening operations, which, of course, result in increased drilling speed and efficiency.

Figure 6:
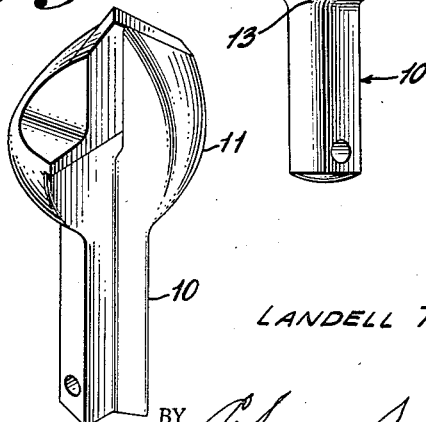
FIG. 6 is a view in perspective showing a modification wherein the entire drill bit is one integral piece.

While a hard metal cutting member in the form of an insert is to be preferred, nevertheless, it is to be understood that the bit of this invention may be manufactured without the use of such hard metal insert merely by providing the entire bit or head portion thereof of suitable metal, in which case the cutting edges will be formed directly on the lobes of the cutting head. This modification of the invention is shown in FIG. 6. However, such a device would have a shorter life than the type described above, but of course would be more economical to produce and would be entirely suitable for occasional use or for the cutting of certain types of stone or other materials.

It will be obvious to those skilled in the art that various changes may be made in the invention, without departing from the spirit and scope thereof, and therefore the invention is not limited by that which is shown in the drawing and described in the specification, but only as indicated in the appended claims.

What is claimed is:

1. A rotary drill bit for stone or the like, said bit comprising a shank for coupling said bit to a drill, said shank merging into an enlarged head having a maximum transverse dimension substantially equal to the diameter of a hole to be drilled by said bit and a minimum transverse dimension substantially less than such diameter, a pair of opposed, longitudinally extending straight flutes in said head dividing the same into opposite transverse lobes, the ends of said lobes remote from said shank being beveled outwardly from the axis of said head, said head having a transverse slot extending through said lobes from the point of maximum transverse dimension to the end remote from said shank, a hard metal cutting member secured in said slot, said cutting member being formed to provide a long cutting edge extending from the axis of said head to the outer edge of one lobe, an axially extending notch in the other lobe and cutting member extending from the outer edge of said other lobe inwardly to a point spaced from the axis of said head, said cutting member being formed to provide a short cutting edge extending from the axis of said head to the edge of said notch, whereby upon rotation of said bit the unequal load resulting from said long and short cutting edges will cause said bit to wobble, thereby removing stone or the like in the form of relatively large particles.

2. A rotary drill bit for stone or the like, said bit comprising a shank coupling said bit to a drill, said shank merging into an enlarged head having a maximum transverse dimension substantially equal to the diameter of a hole to be drilled by said bit, and a minimum transverse dimension substantially less than such diameter, a pair of opposed, longitudinally extending straight flutes in said head dividing the same into opposite, transverse lobes, said head having a transverse slot extending through said lobes from the point of maximum transverse dimension to the end remote from said shank, a hard metal cutting member secured in said slot, said cutting member being formed to provide a long cutting edge extending from the axis of said head to the outer edge of one lobe, an axially extending notch in the other lobe and cutting member extending from the outer edge of said other lobe inwardly to a point spaced from the axis of said head, said cutting member being formed to provide a short cutting edge extending from the axis of said head to the edge of said notch, whereby upon rotation of said bit the unequal load resulting from said long and short cutting edges will cause said bit to wobble, thereby removing stone or the like in the form of relatively large particles.

3. A rotary drill bit for stone or the like, said bit comprising a shank for coupling said bit to a drill, said shank merging into an enlarged head having a maximum transverse dimension substantially equal to the diameter of a hole to be drilled by said bit and a minimum transverse dimension substantially less than such diameter, a pair of opposed, longitudinally extending straight flues in said head dividing the same into opposite transverse lobes, said head having a transverse slot extending through said lobes, a hard metal cutting member secured in said slot, said cutting member being formed to provide a long cutting edge extending from the axis of said head to the outer edge of said cutting member, an axially extending notch in the other lobe and cutting member extending from the outer edge of said other lobe inwardly to a point spaced from the axis of said head, said cutting member being formed to provide a short cutting edge extending from the axis of said head to the edge of said notch, whereupon rotation of said bit the unequal load resulting from said long and short cutting edges will cause said bit to wobble, thereby removing stone or the like in the form of relatively large particles.

4. A rotary drill bit for stone or the like, said bit comprising a shank for coupling said bit to a drill, said shank merging into an enlarged head having a maximum transverse dimension substantially equal to the diameter of a hole to be drilled by said bit and a minimum transverse dimension substantially less than such diameter, a pair of opposed, longitudinally extending straight flutes in said head dividing the same into opposite transverse lobes, one lobe being formed to provide a long cutting edge extending from the axis of said head to the outer edge of said one lobe, an axially extending notch in the other lobe extending from the outer edge of said other lobe inwardly to a point spaced from the axis of said head, said other lobe being formed to provide a short cutting edge extending from the axis of said head to the edge of said notch, whereby upon rotation of said bit the unequal load resulting from said long and short cutting edges will cause said bit to wobble, thereby removing stone or the like in the form of relatively large particles.

References Cited in the file of this patent

UNITED STATES PATENTS

| | | |
|---|---|---|
| 2,673,714 | Hargrave | Mar. 30, 1954 |
| 2,773,672 | Holmes | Dec. 11, 1956 |
| 3,022,840 | Hohos | Feb. 27, 1962 |
| 3,032,129 | Fletcher | May 1, 1962 |